United States Patent
Levola

(10) Patent No.: US 8,331,006 B2
(45) Date of Patent: Dec. 11, 2012

(54) DISPLAY DEVICE AND A METHOD FOR ILLUMINATING A LIGHT MODULATOR ARRAY OF A DISPLAY DEVICE

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 163 days.

(21) Appl. No.: 12/866,401

(22) PCT Filed: Feb. 13, 2008

(86) PCT No.: PCT/FI2008/050061
§ 371 (c)(1),
(2), (4) Date: Sep. 22, 2010

(87) PCT Pub. No.: WO2009/101236
PCT Pub. Date: Aug. 20, 2009

(65) Prior Publication Data
US 2011/0019258 A1    Jan. 27, 2011

(51) Int. Cl.
*G02B 26/00* (2006.01)
(52) U.S. Cl. .......... 359/238; 359/237; 359/291
(58) Field of Classification Search .......... 359/290–292, 359/237, 238, 249
See application file for complete search history.

(56) References Cited

U.S. PATENT DOCUMENTS

| | | | |
|---|---|---|---|
| 5,808,709 A | 9/1998 | Davis et al. | |
| 5,914,760 A | 6/1999 | Daiku | |
| 6,020,944 A | 2/2000 | Hoshi | |
| 6,199,995 B1 | 3/2001 | Umemoto et al. | |
| 6,272,269 B1 | 8/2001 | Naum | |
| 6,273,577 B1 | 8/2001 | Goto et al. | |
| 6,331,916 B1 | 12/2001 | Mukawa | |
| 6,486,997 B1 | 11/2002 | Bruzzone et al. | |
| 6,508,564 B1 | 1/2003 | Kuwabara et al. | |
| 6,540,377 B1 | 4/2003 | Ota et al. | |
| 6,702,446 B2 | 3/2004 | De Vaan et al. | |
| 6,704,144 B2 | 3/2004 | Huang | |
| 6,785,049 B1 | 8/2004 | Boyd et al. | |

(Continued)

FOREIGN PATENT DOCUMENTS
WO    WO2005054936    6/2005

OTHER PUBLICATIONS
International Search Report of PCT/FI2008/050061—Date of Completion of Search: Aug. 12, 2008.

*Primary Examiner* — Mohammed Hasan
(74) *Attorney, Agent, or Firm* — Locke Lord LLP

(57) ABSTRACT

Illuminating light (B2, B3) for a liquid crystal on silicon (LCOS) micro-display (210) is provided by an illuminating unit (100). The illuminating unit (100) has a waveguiding substrate (7) and a plurality of light out-coupling features ($F_{30}$). The substrate (7) has two substantially parallel surfaces (41,42). Light coupled into said substrate (7) is reflected several times on the surfaces (41,42) of the substrate (7) by total internal reflection (TIR) before being coupled out of the substrate (7). Thus a portion (102) of said substrate (7) may act as an optical integrator for smoothing out variations in spatial intensity distribution of light propagating within said substrate (7). The out-coupling efficiencies of the out-coupling features ($F_{30}$) may be selected to minimize vignetting and/or to minimize stray light effects.

20 Claims, 12 Drawing Sheets

U.S. PATENT DOCUMENTS

| | | |
|---|---|---|
| 6,801,285 B1 | 10/2004 | Shi et al. |
| 6,814,442 B2 | 11/2004 | Okuyama et al. |
| 6,924,870 B1 | 8/2005 | Wang et al. |
| 7,066,601 B2 | 6/2006 | Lee et al. |
| 7,152,977 B2 | 12/2006 | Ruda et al. |
| 7,163,295 B2 | 1/2007 | Kim |
| 7,172,287 B2 | 2/2007 | Kang |
| 7,206,134 B2 | 4/2007 | Weissman et al. |
| 7,215,391 B2 | 5/2007 | Kuan et al. |
| 2001/0038532 A1* | 11/2001 | Harbers et al. ............... 362/31 |
| 2002/0003508 A1 | 1/2002 | Schehrer et al. |
| 2002/0176054 A1 | 11/2002 | Mihalakis |
| 2002/0181117 A1 | 12/2002 | Huang |
| 2003/0076461 A1 | 4/2003 | Liu et al. |
| 2003/0142276 A1 | 7/2003 | English, Jr. et al. |
| 2004/0008291 A1 | 1/2004 | van Gelder et al. |
| 2004/0174348 A1 | 9/2004 | David |
| 2004/0218390 A1 | 11/2004 | Holman et al. |
| 2005/0036119 A1 | 2/2005 | Ruda et al. |
| 2005/0117220 A1 | 6/2005 | De Vaan et al. |
| 2005/0122707 A1 | 6/2005 | Kim |
| 2005/0151939 A1 | 7/2005 | English, Jr. et al. |
| 2005/0185147 A1 | 8/2005 | Berman |
| 2005/0275762 A1 | 12/2005 | Lin et al. |
| 2005/0286135 A1 | 12/2005 | Weissman et al. |
| 2006/0077318 A1 | 4/2006 | Bhowmik |
| 2006/0077690 A1 | 4/2006 | Inditsky |
| 2006/0082693 A1 | 4/2006 | Huang et al. |
| 2006/0119936 A1 | 6/2006 | Ockenfuss |
| 2006/0176256 A1 | 8/2006 | Yen et al. |
| 2006/0197914 A1 | 9/2006 | Robinson |
| 2006/0198027 A1 | 9/2006 | Li et al. |
| 2006/0255346 A1* | 11/2006 | Kunimochi ............... 257/89 |
| 2007/0002279 A1 | 1/2007 | Berman |
| 2007/0040965 A1 | 2/2007 | Kuan et al. |
| 2007/0091450 A1 | 4/2007 | Detro |

* cited by examiner

DISPLAY DEVICE AND A METHOD FOR ILLUMINATING A LIGHT MODULATOR ARRAY OF A DISPLAY DEVICE

BACKGROUND

An image projector device or a virtual display device may comprise a light modulator array to generate an image. The modulator array may be e.g. Liquid Crystal on Silicon (LCOS) chip or a digital micromirror device (DMD). A modulator array which does not emit light itself needs further means to provide light.

Spatial variations in the intensity of the illuminating light affect the quality of the displayed image.

Patent application US 2002/0176054A1 discloses a light pipe to provide a uniform light beam for illuminating an LCOS imager.

U.S. Pat. No. 7,152,977 discloses a diffuser for homogenizing illuminating light for an LCOS imager.

U.S. Pat. No. 6,814,442 discloses a virtual display comprising a light guide plate to illuminate a reflective imager.

SUMMARY

An object of the invention is to provide a display device. Another object of the invention is to provide a method for illuminating a light modulator array of a display device.

According to a first aspect of the invention, there is provided a device for displaying images, said device comprising:
- a light source to emit light,
- an illuminating unit to provide illuminating light by distributing light emitted from said light source,
- a reflective light modulator array comprising a plurality of pixels for modulating said illuminating light, and
- imaging optics to focus or collimate light modulated by said pixels, wherein said illuminating unit comprises a substrate having two surfaces separated by a substantially constant distance, said substrate further comprising:
- an in-coupling portion to couple light of said light source into said substrate to form a waveguided beam which is confined to said substrate by total internal reflections at said surfaces,
- an integrating portion to reduce spatial variations in the intensity of said waveguided beam, and
- an out-coupling portion to provide said illuminating light by coupling light of said waveguided beam out of said substrate through one of said surfaces.

According to a second aspect of the invention, there is provided a method for displaying images comprising
- coupling light through an in-coupling portion to a substrate of an illuminating unit to form a waveguided beam which is confined to said substrate by total internal reflections on two surfaces of said substrate, said surfaces being separated by a substantially constant thickness,
- transmitting said waveguided beam through an integrating portion of said substrate in order to reduce spatial variations in the intensity of said waveguided beam,
- coupling light of said in-coupled beam out of said substrate through at least one of said surfaces by an out-coupling portion of said illuminating unit in order to provide illuminating light,
- reflecting and modulating said illuminating light by pixels of a reflective light modulator array, and
- focusing or collimating light reflected from said pixels in order to display said images.

The illuminating unit provides a cost-effective and compact way to homogenize the illuminating light and to distribute the illuminating light to the modulator array.

The spatial distribution of out-coupling efficiency of the out-coupling portion may be non-uniform in order to improve the quality of the displayed images.

In an embodiment, the spatial distribution of the out-coupling efficiency of the out-coupling portion is arranged to reduce vignetting.

In an embodiment, the spatial distribution of the out-coupling efficiency of the out-coupling portion is arranged to reduce stray light.

In an embodiment, the out-coupling portion comprises out-coupling elements which are arranged to direction-selectively couple light out of the substrate in order to provide energy-efficient angular distribution of the illuminating light. In other words, the out-coupling elements may have a high efficiency for coupling light propagating in a predetermined direction within said substrate out of said substrate, wherein the elements have a lower efficiency for coupling light propagating in other directions out of said substrate.

The out-coupling elements may be e.g. prisms, diffractive gratings, or holograms.

In an embodiment, several light sources may be arranged side by side to emit light into the same substrate. The light sources may have different colors in order to implement a color display.

In an embodiment, the illuminating unit may comprise several stacked substrates in order to implement a color display. For example, the out-coupling portion of a first substrate may be arranged to provide red light. Green light emitted by the out-coupling portion of a second substrate may be transmitted through the out-coupling portion of said first substrate.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings, in which.

DETAILED DESCRIPTION

Figure 1:
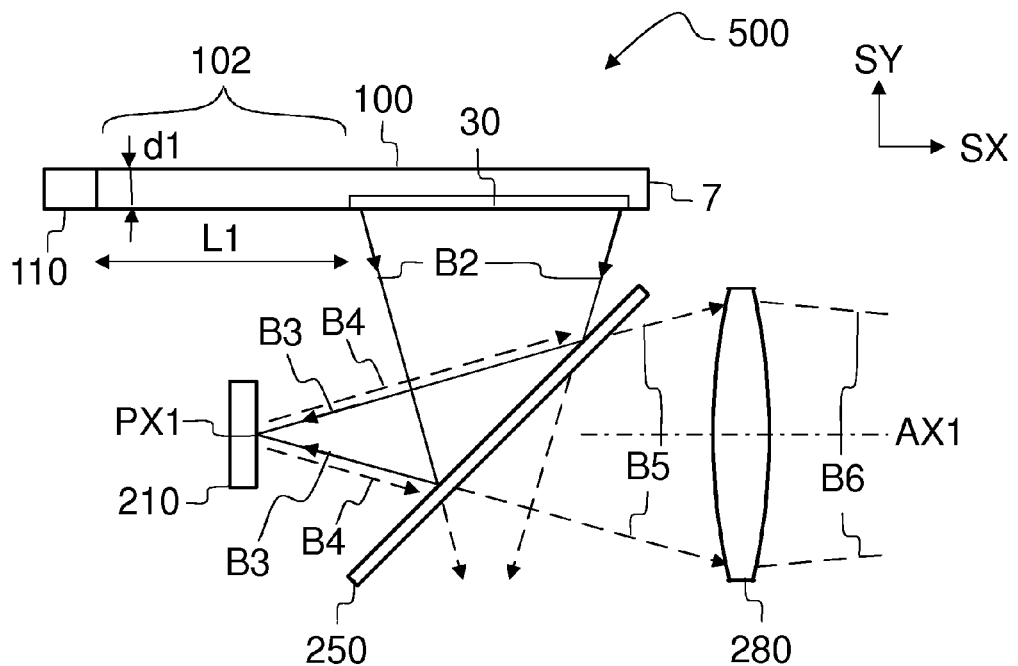
FIG. 1 shows, in a side view, a display device comprising an illuminating unit.

Referring to FIG. 1, a display device 500 may comprise an illuminating unit 100, a light source 110, a two-dimensional reflective modulator array 210, and imaging optics 280. The illuminating unit 100 comprises a waveguiding substrate 7, an integrating portion 102, and an out-coupling portion 30. In-coupled light is confined to the substrate 7 by total internal reflections (TIR), i.e. light is waveguided within the substrate 7. Light emitted by the light source 110 is coupled into the substrate e.g. through the edge of said substrate 7. The light is reflected several times on the surfaces of the substrate in the integrating portion 102. Consequently, the integrating portion 102 may act as an optical integrator to reduce variations in spatial intensity distribution of light propagating within said substrate 7 before it is coupled out of the substrate 7. Out-coupled light B2, B3 provided by the out-coupling portion 30 may impinge on the modulator array 210. Light B4, B5 may be reflected from each pixel PX1 of the modulator array 210 towards the imaging optics 280, depending on the state of said pixel PX1. Each pixel PX1 may be in a reflecting state or in a non-reflecting state. In certain cases the pixels PX1 may also be set into a partially reflecting state. The imaging optics 280 focuses or collimates light B43, B5 reflected from the modulator array 210, providing a focused or collimated light beam B6. AX1 denotes the optical axis of the imaging optics 280.

Illuminating light B2, B3 provided by the illuminating unit 100 may be arranged to impinge to all pixels PX1 of the modulator array 210.

Figure 4:
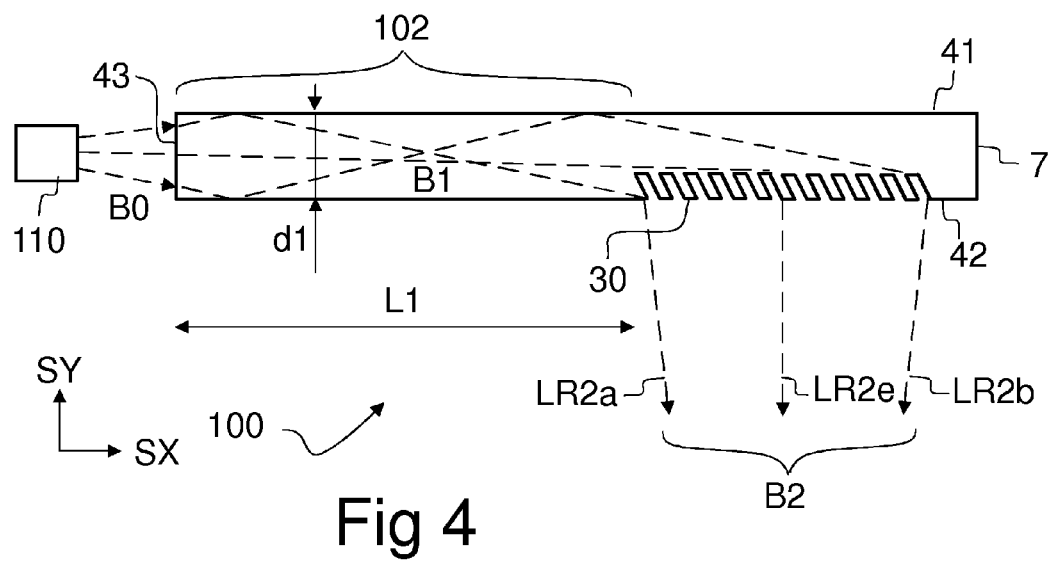
FIG. 4 shows, in a side view, an illuminating unit, wherein light is coupled into the edge of said unit.
Figure 5:
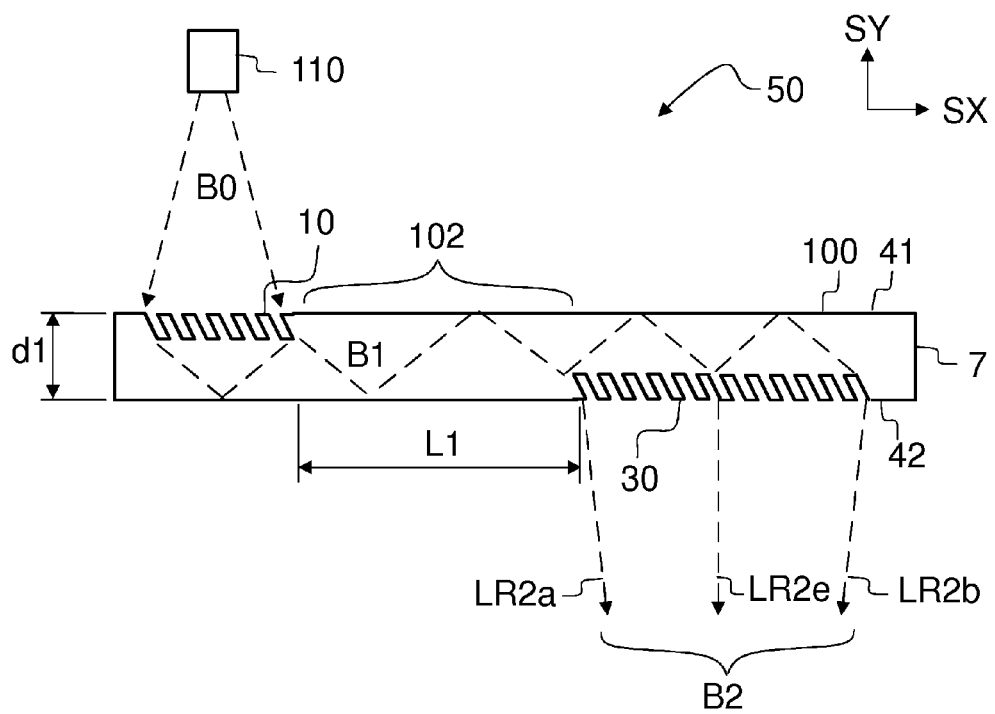
FIG. 5 shows, in a side view, an illuminating unit, wherein light is coupled through an upper surface into said unit.

In order to provide sufficient homogenization of light B1 propagating inside the integrating portion 102, the ratio of the length L1 of said integrating portion 102 to the thickness d1 of said integrating portion 102 may be greater than or equal to 10, preferably greater than 50 (see also FIGS. 4 and 5). Said ratio may even be greater than or equal to 200 to attain a high degree of homogenization.

As the integrating portion 102 and the out-coupling portion 30 are implemented on the same substrate 7, the optical coupling between the integrating portion 102 and the out-coupling portion 30 is almost perfect. Consequently, the thickness d1 may be reduced without compromising the optical coupling efficiency between the integrating portion and the out-coupling portion 30. The size of the illuminating unit 100 may be kept compact. There is not need to align the integrating portion 102 with respect to the substrate 7.

Directions SX, SY and SZ are orthogonal. The surfaces 41, 42 of the substrate 7 may be substantially parallel to a plane defined by the directions SX and SZ (See FIG. 10d).

The width of the substrate 7, and in particular the width of the integrating portion 102 (in the direction SZ) may be greater than or equal to 10 times the thickness d1 of said integrating portion 102 in order to allow lateral spreading of the in-coupled light B1.

In particular, the display device 500 may comprise a polarizing beamsplitter 250, which is arranged to provide a substantially polarized illuminating beam B3 by reflecting a predetermined polarization of out-coupled light beam B2. Light having the other polarization state may be transmitted through the beamsplitter 250. The illuminating beam B3 impinges on the pixels PX1 of the modulator array 210. Light B4 is reflected from the pixels PX1 towards the beamsplitter 250. Light reflected from a polarization-rotating pixel PX1 may be transmitted through the beamsplitter 250 providing a transmitted beam B5. The imaging optics 280 focuses or collimates the light B5, providing a focused or collimated beam B6. Light rays reflected from those pixels which maintain the original polarization of the light B3 do not pass through the beamsplitter 250 to the imaging optics 280, but are reflected towards the illuminating unit 100 again.

In particular, the beamsplitter 250, the modulator array 210, and the imaging optics 280 may be arranged so that the optical axis AX1 of the imaging optics 280 passes approximately through the center of the active area of the modulator array 210, such that the modulator array 210 is substantially perpendicular to the axis AX1, and such that the reflecting plane of the beamsplitter 250 is substantially at a 45 degree angle with respect to said optical axis AX1.

Figures 2A, 2B:
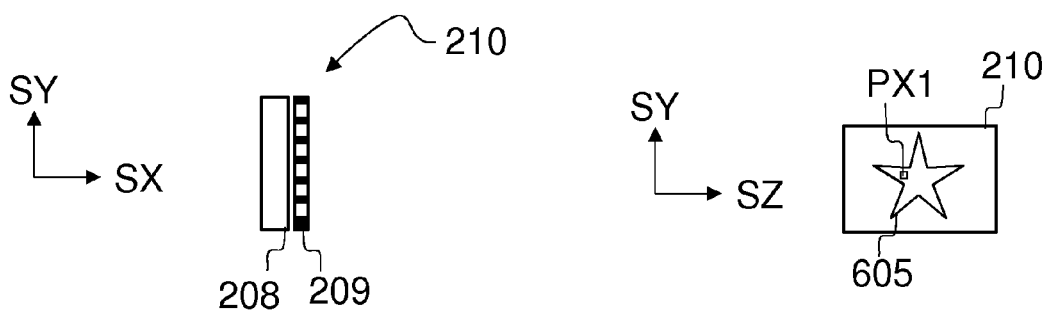
FIG. 2a shows, in a side view, reflective light modulator.
FIG. 2b shows an image formed by the reflective light modulator of FIG. 2a, FIG. 3a shows, in a side view, the display device acting as a projecting device.

Referring to FIG. 2a, the modulator array 210 may be a liquid crystal on silicon array, i.e. an LCOS-array. The LCOS array comprises a reflective layer 208 and liquid crystal layer 209.

Referring to FIG. 2b, an image 605 may be formed on the modulator array 210 by changing the states of individual pixels PX1. The state of a pixel PX1 may be changed e.g. by changing the orientation of liquid crystals by applying a voltage to electrodes.

The LCOS array is especially suitable for use in the arrangement shown in FIG. 1. The LCOS array is polarization changing, and allows effective use of the polarizing beamsplitter 250. The polarizing beamsplitter 250 allows substantially perpendicular illumination. Consequently, a light ray, which is transmitted through a miniature portion on the liquid crystal layer 209, is reflected back substantially through the same miniature portion. Thus, the interfering effect of adjacent pixels is minimized when compared to a situation in which the illuminating rays impinge on the modulator array 210 e.g. at an angle of 30 degrees.

The device 500 may also arranged in an off-axis configuration comprising a first polarizer to polarize the illuminating beam B3, and a second polarizer for the reflected beam B4. The modulator array 210 may be inclined with respect to the optical axis AX1 of the imaging optics 280.

The modulator array 210 may also be digital micromirror device (DMD), i.e. a micromirror array comprising a plurality of mechanically movable miniature mirrors. In that case the device 500 may be implemented without the polarizers.

The substrate 7 may comprise or consist of e.g. polycarbonate, polymethyl methacrylate (PMMA), or glass.

Figure 3A:
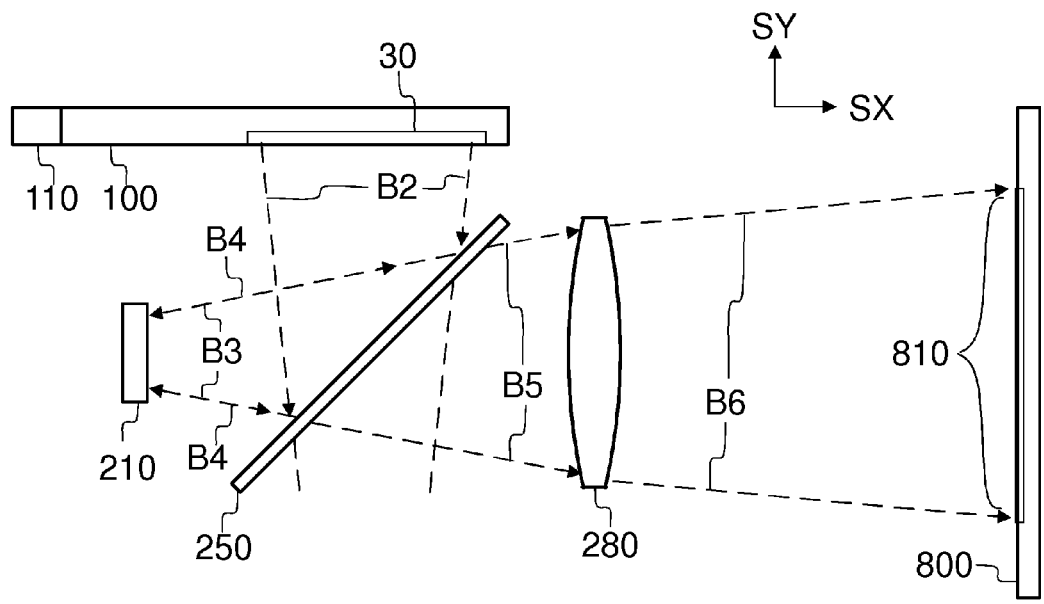
FIG. 3b shows, in a side view, the display device acting as a virtual display.

Referring to FIG. 3a, the display device 500 may be an image projector. The imaging optics 280 may focus light B6 on an external screen 800 in order to project a real image 810 to said screen. Light reflected from each pixel PX1 of an image is substantially focused into a corresponding spot on the screen 800. The distance between the device 500 and the screen may be e.g. several meters, and the displayed image 810 may be viewed by several persons.

Figure 3B:
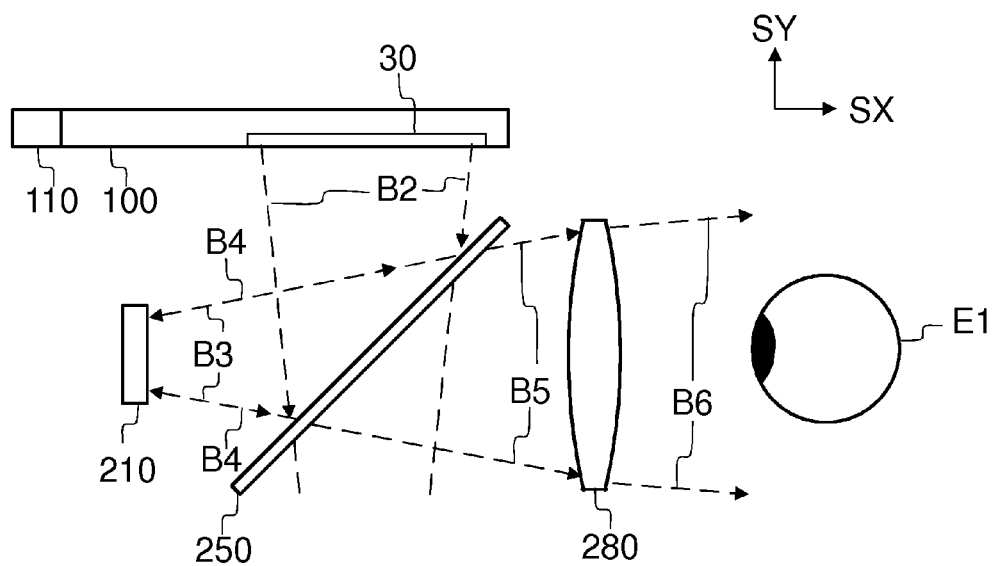

Referring to FIG. 3b, the display device 500 may be a virtual display. The imaging optics 280 may be arranged to collimate light reflected from each pixel PX1 of an image. An image typically comprises several pixels PX1. The collimated beams B6 corresponding to the several pixels, and which impinge on the eye E1 of a viewer, create an impression of a virtual image 710 located at an infinite distance from the viewer (See FIG. 14).

The optical power level required in case of the image projector (FIG. 3a) is by several orders of magnitude greater than in case of the virtual display (FIG. 3b).

Referring to FIG. 4, the illuminating unit 100 comprises a waveguiding substrate 7. The substrate 7 has two surfaces 41, 42. The surfaces are separated by a substantially constant distance d1. The surfaces 41, 42 may be substantially planar or curved. The substrate 7 may be e.g. cut from a sheet of plastics having substantially constant thickness d1. The substrate may even be flexible.

In case of substantially planar surfaces 41, 42, the surfaces 41, 42 are substantially parallel. Thus, consecutive total internal reflections on the surfaces 41,42 do not substantially change the divergence of the beam B1 propagating within the substrate 7.

In case of the curved surfaces 41, 42, the surfaces 41, 42 are substantially parallel in the local sense, i.e. locally parallel. In other words, those portions of the surfaces 41, 42 which are opposite each other are substantially parallel.

Light B0 provided by a light source 110 may be coupled into the substrate 7 through an edge 43 to form an out-coupled light beam B2, which may comprise light rays LR2a, LR2b, LRe. The edge 43 may be substantially perpendicular to the surfaces 41, 42. B1 denotes in-coupled light waveguided within the substrate 7. The in-coupled light B1 is confined to said substrate 7 by total internal reflections (TIR) at said surfaces 41, 42. Light is coupled out of the substrate 7 by an out-coupling portion 30. The out-coupling portion 30 may comprise e.g. a diffraction grating or a prism structure.

Lenses, mirrors and/or gratings may be positioned between the edge 43 and the light source 110 in order to modify intensity distribution of the in-coupled light B1. A lens surface or grating may be implemented directly on the edge 43.

Two or more light sources 110 may be arranged side by side to emit light of different colors into the same substrate 7.

Referring to FIG. 5, light B0 of the light source 110 may be coupled into the substrate 7 through one of the surfaces 41, 42 by using an in-coupling portion 10. The in-coupling portion 10 may be e.g. a diffraction grating or a prism structure. The surfaces 41, 42 are separated by the substantially constant distance d1. The surfaces 41, 42 may be substantially planar or curved.

The illuminating unit 100 may be a diffractive beam expander 50 comprising a diffractive in-coupling portion 10 and a diffractive out-coupling portion 30.

L1 denotes the distance between the in-coupling portion 10 and the out-coupling portion 30, i.e. the length of the integrating portion 102 (FIG. 1). d1 denotes the thickness of the substrate 7. The ratio L1/d1 may be selected to be e.g. greater than or equal to 200 so as to effectively smooth out spatial variations in the intensity of the in-coupled beam B1.

Lenses, mirrors and/or gratings may be positioned between the light source 110 and the in-coupling portion 10 in order to modify intensity distribution of the in-coupled light B1

Two or more light sources 110 may be arranged side by side to emit light of different colors into the same substrate 7.

The substrate 7 of the illuminating unit 100 may be planar or slightly curved. The substrate 7 may have a substantially constant thickness d1 at least over the integrating portion 102 and the out-coupling portion 30. The substrate 7 may be e.g. cylindrically curved. The substrate 7 may be e.g. cut from a sheet of constant thickness d1. The in-coupling portion 10 and the out-coupling portion 30 may be implemented e.g. by embossing on the surfaces 41, 42 of the substrate.

Figure 6:
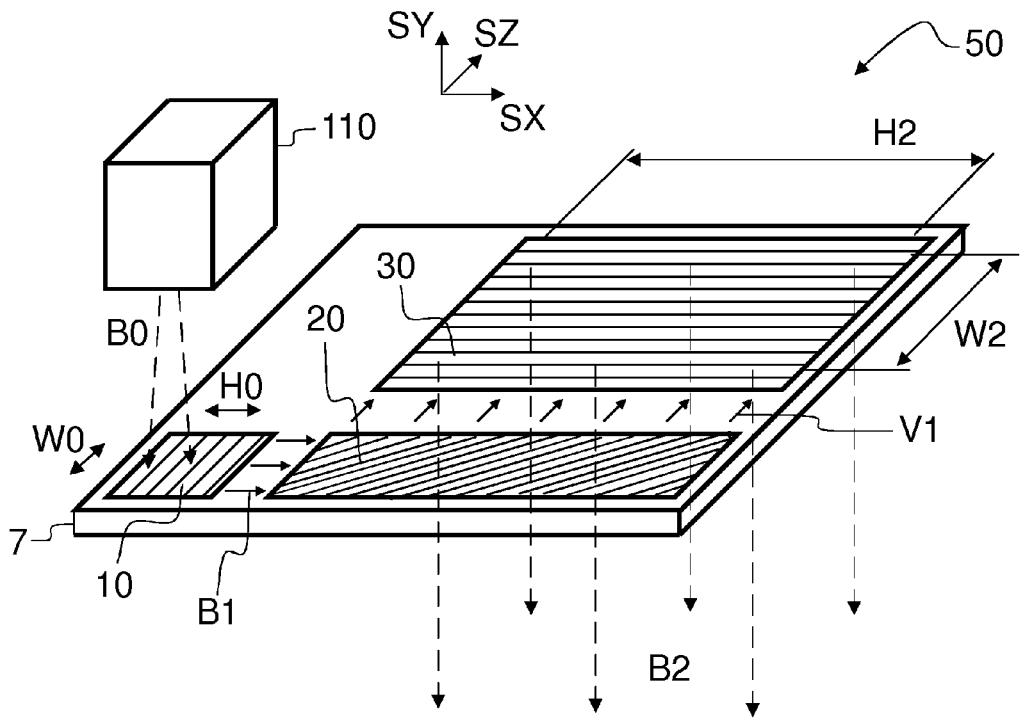
FIG. 6 shows, in a three-dimensional view, a diffractive beam expander.

Referring to FIG. 6, a diffractive beam expander 50 may be arranged to expand the dimensions of a narrow light beam B0 in two directions. A narrow beam B0 emitted by the light source 110 has a dimension W0 in the direction SZ and a dimension H0 in the direction SX. An in-coupling grating 10 provides an in-coupled beam B1 by diffracting light of the beam B0. An intermediate grating 20 provides an expanded beam V1 by diffracting light of said in-coupled beam B1. Also the expanded beam is waveguided within the substrate 7. The expanded beam V1 has a greater dimension than the narrow beam B0 in the direction SX. The out-coupling grating 30 provides an out-coupled illuminating beam B2 by diffracting light of the expanded beam V1. The dimensions H2 and W2 of the out-coupled beam B2 are greater than the dimensions of the original narrow beam B0. The gratings 10, 20, 30 may comprise a plurality of substantially linear diffractive features, e.g. ridges and grooves.

U.S. Pat. No. 6,580,529 discloses such a diffractive beam expander for expanding an exit pupil in two dimensions. The patent discloses also a display device based on said beam expander.

Patent application US 2006/0126182 discloses a diffractive beam expander comprising a first diffractive element to couple light into a substrate, a second diffractive element to couple light out of the substrate, and an intermediate diffractive element to diffract in-coupled light towards the second diffractive element. The intermediate diffractive element has a substantially periodic pattern composed of substantially linear elements for producing conical diffraction.

Figure 7:
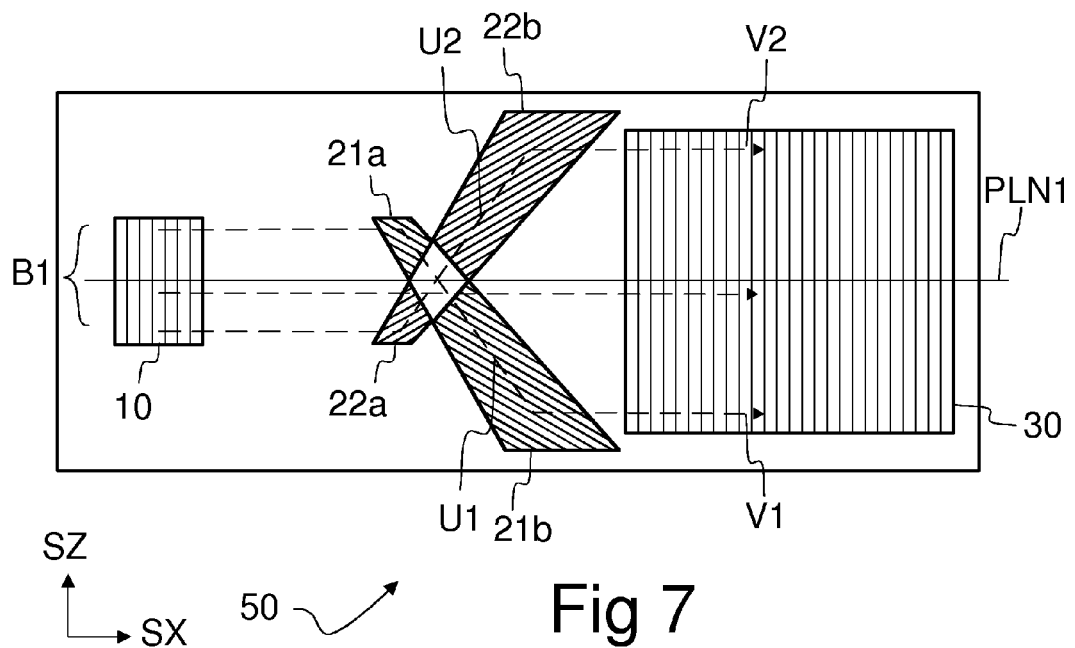
FIG. 7 shows, in a top view, a diffractive beam expander.

Referring to FIG. 7, a diffractive beam expander 50 may comprise a first deflecting portion 21a and a first restoring portion 21b. The deflecting portion 21a provides a deflected beam U1 by diffracting light of the in-coupled beam B1. The restoring portion 21b provides a restored beam V1 by diffracting light of said deflected beam U1. The beams U1 and V1 are waveguided within the substrate 7. The restored beam V1 together with an undiffracted part of the original in-coupled beam B1 forms an enlarged beam, which has a greater dimension in the direction SZ than the original in-coupled beam B1. The out-coupling grating 30 provides expansion also in the direction SX.

The diffractive beam expander 50 may further comprise a second deflecting portion 22a and a restoring portion 22b. The second deflecting portion 22a provides a second deflected beam U2, and the second restoring portion 22b provides a second restored beam V2. The restored beams V1 and V2 form an expanded beam which may be coupled out of the substrate by the out-coupling grating 30.

The portions 21a and 22b may be on a first side of a reference plane PLN1, and the portions 22a and 21b may be on a second side of a reference plane PLN1. The reference plane PLN 1 is substantially perpendicular to the gratings 10, 30, and consequently it appears as a line in FIG. 7. The deflected beams U1 and U2 may pass through said plane PLN1.

The gratings 10, 21a,21b, 22a, 21b, 30 may comprise a plurality of substantially linear diffractive features, e.g. ridges and grooves.

The diffractive beam expander 50 of FIG. 7 may also be implemented without the deflecting and restoring gratings 21a,21b, 22a, 21b. In that case the in-coupling grating 10 may have curved diffractive features. To provide beam expansion in two directions. Also the out-coupling grating 30 may have curved diffractive features.

Figure 8A:
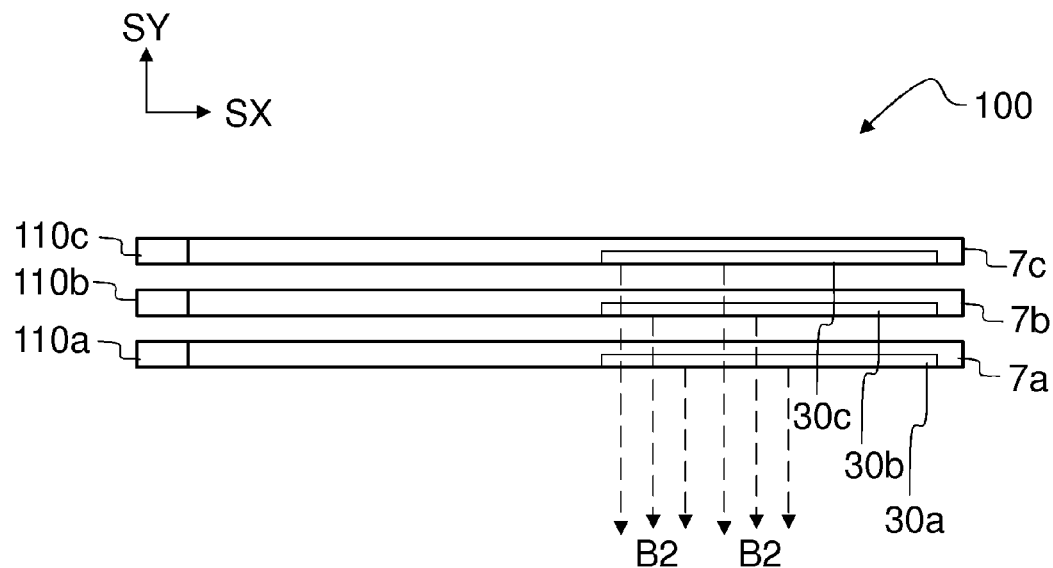
FIG. 8a shows, in a side view, an illuminating unit comprising a plurality of stacked substrates, wherein light is coupled into the edges of said substrates.

Referring to FIG. 8a, the illuminating unit 100 may comprise two or more stacked substrates 7a, 7b, 7c. Light provided by the out-coupling portion 30b of the second substrate 7b may be arranged to pass through the first substrate 7a, in particular through the out-coupling portion 30a of said substrate 7a. In particular, the out-coupling portion 30a may be at least partially light-transmitting at the wavelengths provided by the second out-coupling portion 30b.

Light provided by the out-coupling portion 30c of a third substrate may be arranged to pass through the substrates 7a and 7b. Light for the substrates may be provided using different light sources 110a, 110b, 110c. The first substrate 7a may be arranged to transmit red color, the second substrate 7b may be arranged to transmit green color, and the third substrate 7c may be arranged to transmit blue color.

The light sources 110a, 110b, 110c may be arranged to emit light in sequential order, and the modulator array 210 may be synchronized with the operation of the light sources 110a, 110b, 110c in order to display multi-color images.

Light sources having different colors may also be arranged to emit light into the same substrate 7.

Figure 8B:
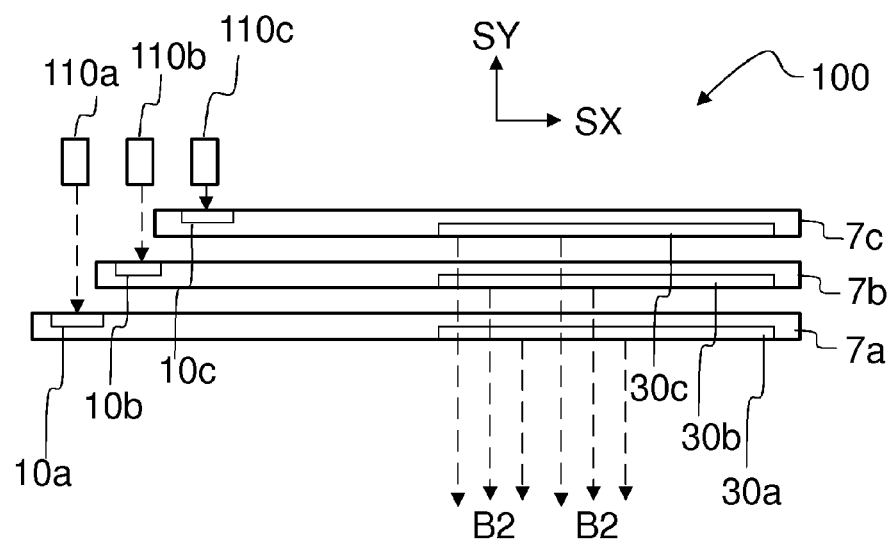
FIG. 8b shows, in a side view, an illuminating unit comprising a plurality of stacked substrates, wherein light is coupled through the surfaces of said substrates.

Referring to FIG. 8b, light may be coupled into the substrates 7a, 7b, 7c by using in-coupling portions 10a, 10b, 10c.

Figure 9A:
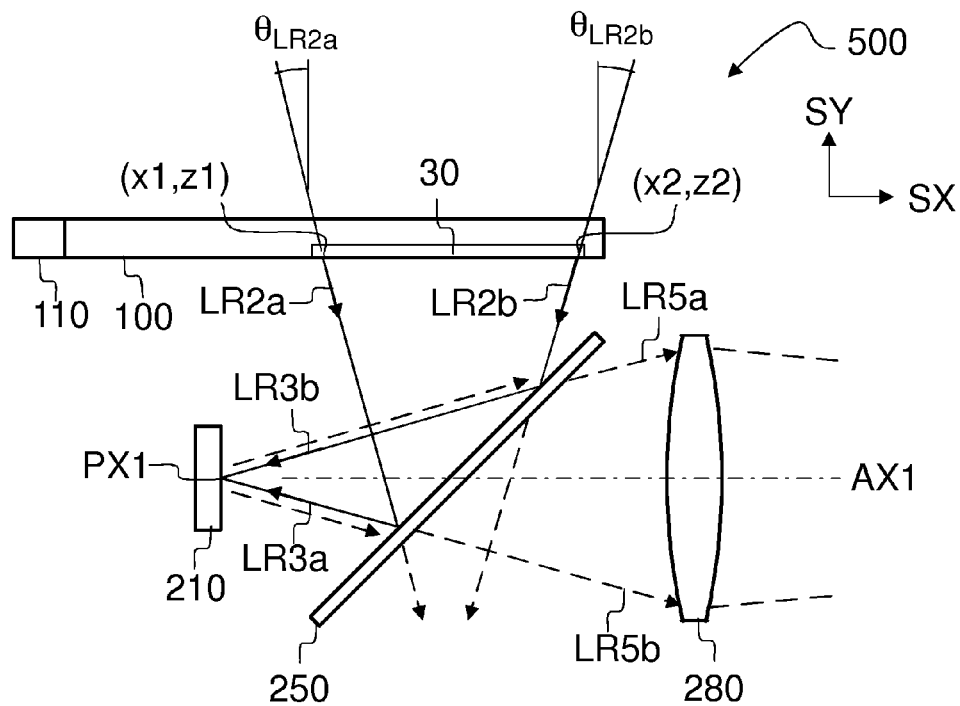
FIG. 9a shows, in a side view, propagation of light rays modulated by a first pixel of the modulator, said first pixel being at the center of the modulator.

FIG. 9a shows illumination of a pixel PX1 which is located at the center of the modulator array 210. The angle between the reflecting surface of the beamsplitter 250 and the optical axis AX1 is substantially equal to 45 degrees. The out-coupling portion 30 provides light rays LR2a and LR2b. The beamsplitter 250 reflects and polarizes the light of the rays LR2a and LR2b and provides polarized rays LR3a and LR3b. The pixel PX1 reflects the light of the rays LR3a and LR3b and provides reflected rays LR5a and LR5b. Both reflected rays LR5a and LR5b impinge on the aperture of the imaging optics 280.

(x1,z1) denotes the coordinates of a first light-emitting point on the out-coupling portion 30. (x2,z2) denotes a second light-emitting point on the out-coupling portion 30. The light ray LR2a is emitted from the first point and the ray LR2b from the second point. The light ray LR2a has a zenith angle $\theta_{LR2a}$, and an azimuth angle $\theta_{LR2a}$ (not shown in FIG. 9a). The light ray LR2b has a zenith angle $\theta_{LR2b}$, and an azimuth angle $\phi_{LR2b}$ (not shown in FIG. 9a).

Figure 9B:
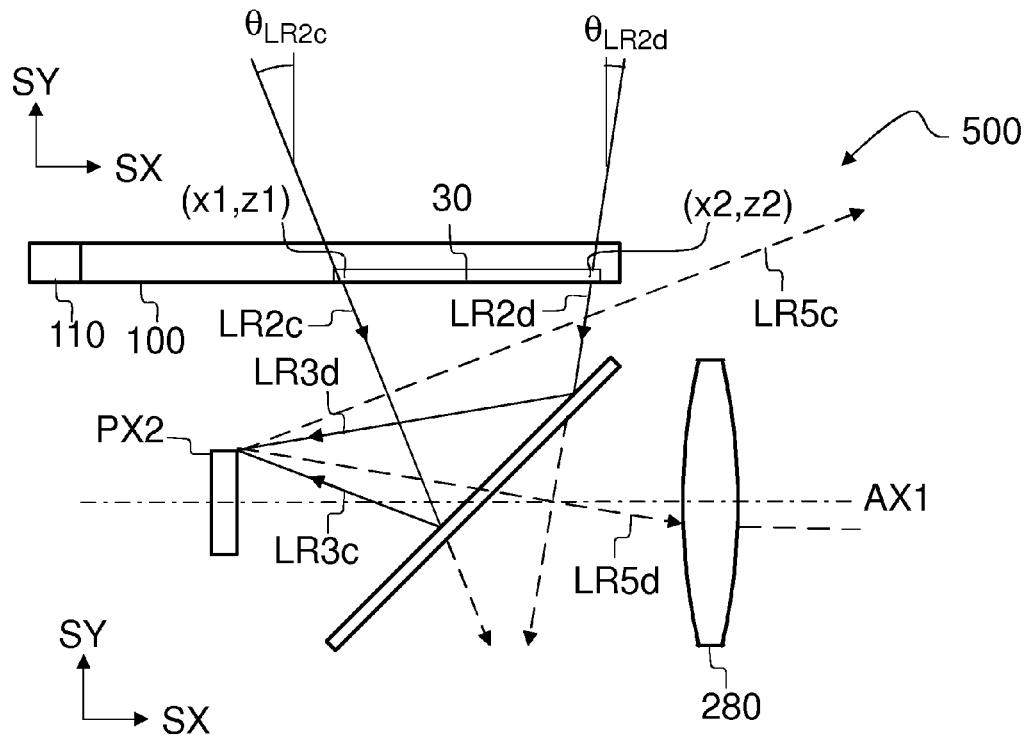
FIG. 9b shows, in a side view, propagation of light rays modulated by a first pixel of the modulator, said first pixel being near the side of the modulator.

FIG. 9b shows illumination of a second pixel PX2 which is located at the edge of the modulator array 210. The beamsplitter 250 reflects and polarizes the light of the rays LR2c and LR2d and provides two polarized rays LR3c and LR3d. The pixel PX1 reflects the light of the rays LR3c and LR3d and provides reflected rays LR5c and LR5d. However, the reflected ray LR5c does not impinge on the aperture of the imaging optics 280. Consequently, optical power of the ray LR5c is wasted, and the ray LR5c may even cause harmful stray light effects.

In case of FIG. 9b, only a part of the optical power of the illuminating beam B2, B3 contributes to the forming of the image. This may cause relative darkening of the peripheral portions of a displayed image. This phenomenon is known as "vignetting".

Vignetting and/or stray light effects may be reduced by tailoring the angular out-coupling efficiencies at different locations on the out-coupling portion and/or the lateral intensity distribution of the in-coupled beam B1 in the direction SZ.

By comparing FIGS. 9a and 9b, it may be noticed that the optical power of the ray LR2d should be higher than the optical power of the ray LR2b in order to provide substantially similar brightness at the center of the displayed image and at the periphery of the displayed image. This may be attained by selecting a higher diffraction efficiency, at the location (x1,z1) in the direction of the ray LR2d than in the direction of the ray LR2b. x1 denotes a coordinate in the direction SX and z1 denotes a coordinate in the direction SZ (FIGS. 10a and 10d).

The optical power of the ray LR2c appears to be wasted. Consequently, the diffraction efficiency in the direction LR2c may be selected to be substantially lower than in the direction LR2a, at the location (x2,z2). x2 denotes a coordinate in the direction SX and z2 denotes a coordinate in the direction SZ (FIGS. 10a and 10d). In particular, the diffraction efficiency in the direction LR2d may be selected to be substantially equal to zero in order to avoid losing energy and in order to minimize stray light effects.

The light ray LR2c has a zenith angle $\theta_{LR2c}$, and an azimuth angle $\phi_{LR2c}$ (not shown in FIG. 9a). The light ray LR2d has a zenith angle $\theta_{LR2d}$, and an azimuth angle $\phi_{LR2d}$ (not shown in FIG. 9a).

Figure 10A:
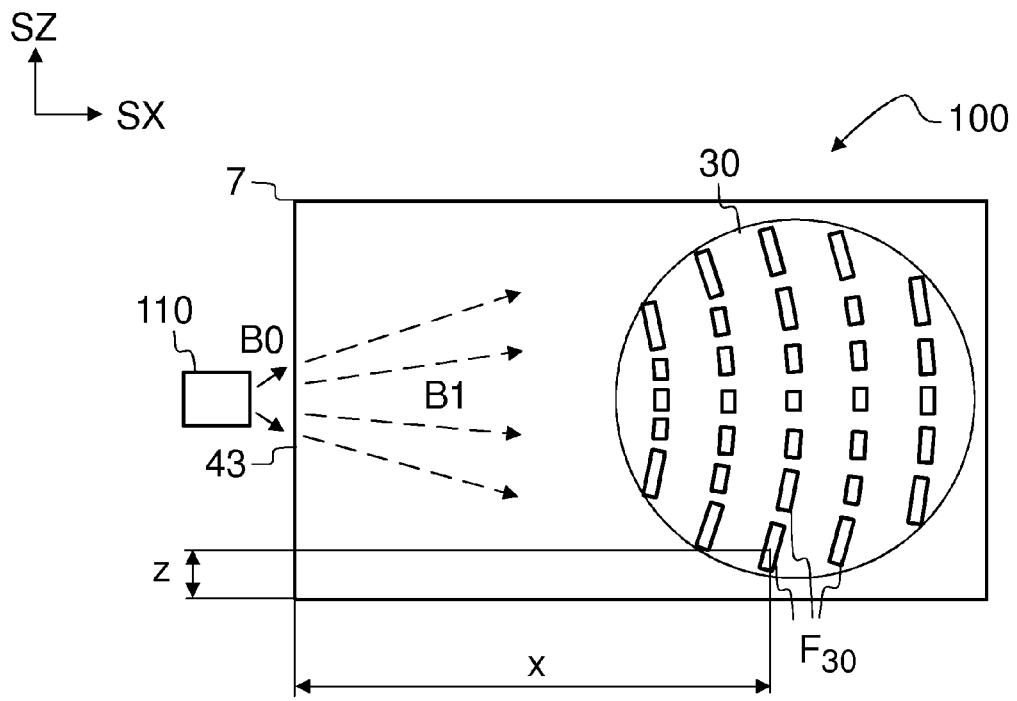
FIG. 10a shows, in a top view, a plurality of light out-coupling elements of the illuminating unit.

Referring to FIG. 10a, the out-coupling portion 30 may comprise a plurality of out-coupling elements $F_{30}$. The location of each feature may be specified by the coordinates x and z. The elements $F_{30}$ may be e.g. reflective or refractive prisms, diffractive gratings, or holograms.

The out-coupling elements $F_{30}$ change the direction of the waveguided light B1 so that it may escape through the upper 41 and/or lower surface 42 of the substrate 7.

The spatial distribution of out-coupling efficiency over said out-coupling portion 30 may be non-uniform in order to provide advantageous spatial and/or directional radiance distribution.

The efficiency of coupling light out of the substrate 7 may be selected to be greater near the periphery of the out-coupling portion 30 than near the center of the out-coupling portion e.g. in order to reduce vignetting.

Figure 10B:
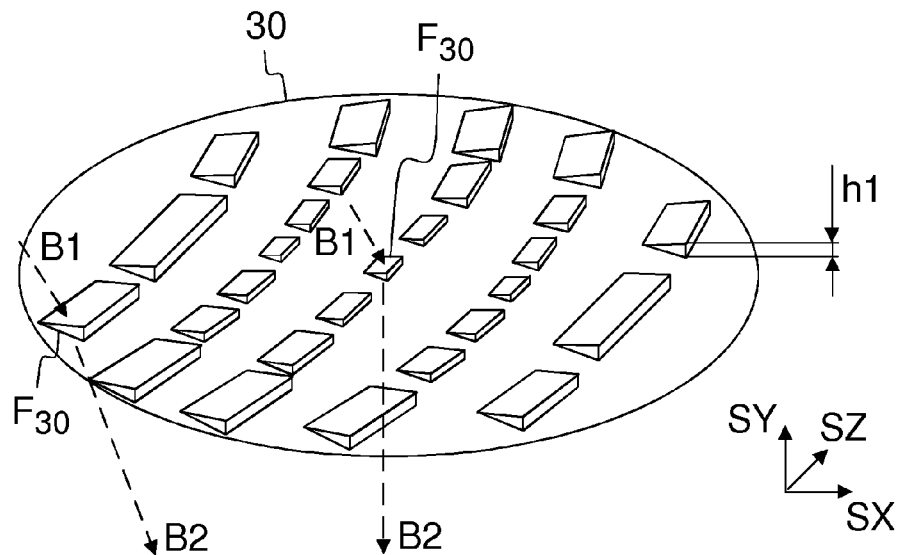
FIG. 10b shows, in a three-dimensional view, an out-coupling portion comprising a plurality of prisms.

Referring to FIG. 10b, the out-coupling elements $F_{30}$ may be prisms. The height h1 of the prisms may be lower near the center of said out-coupling portion 30 than near the periphery of said out-coupling portion 30 in order to tailor the spatial and directional radiance distribution provided by the out-coupling portion 30, e.g. in order to reduce vignetting.

The surface of the substrate 7 between adjacent prisms may be substantially flat. Consequently, the fractional area covered by prisms may be smaller than 100%, e.g. in the range of 10% to 90%. The fractional area covered by prisms on an unit area at a predetermined location (x,z) means the ratio of summed base area of said prisms on said unit area to the whole area of said unit area.

The out-coupling portion 30 may comprise prisms which are arranged such that the fractional area covered by prisms is lower near the center of said out-coupling portion 30 than near the periphery of said out-coupling portion 30 e.g. in order to reduce vignetting.

The prisms may also be reflective. For example, inclined facets of the prisms may be coated with a reflective coating, or arranged such that light may be reflected by total internal reflection in a predetermined direction.

Figure 10C:
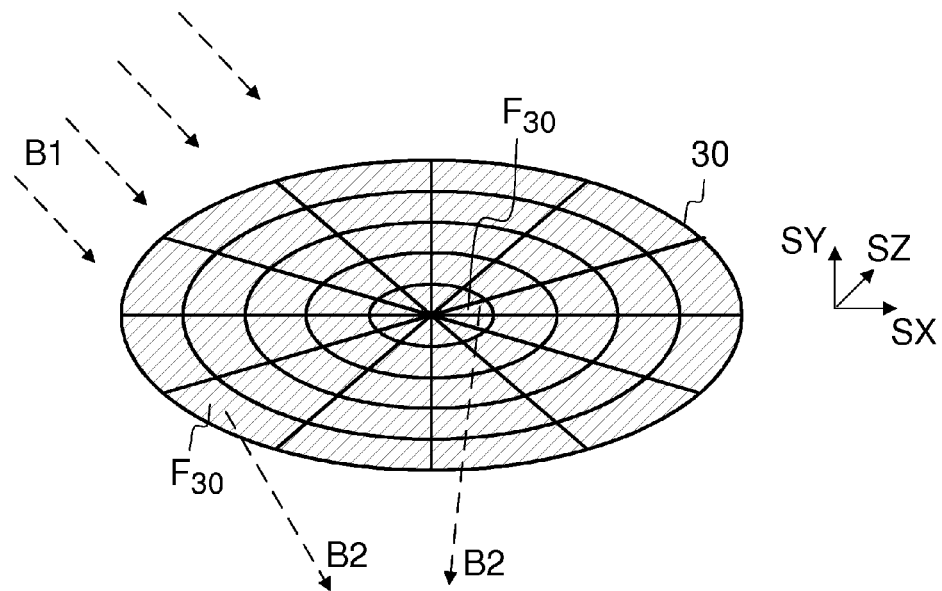
FIG. 10c shows, in a three-dimensional view, an out-coupling portion comprising a plurality of diffractive zones having different diffractive properties.
Figure 10D:
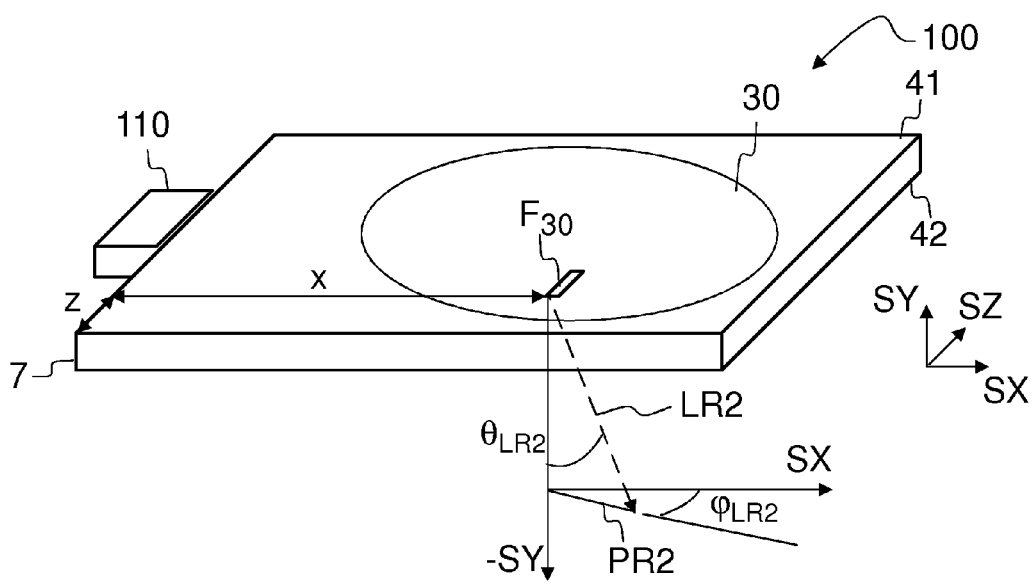
FIG. 10d shows, in a three-dimensional view, the direction of a light ray coupled out of the substrate by an out-coupling element.

Referring to FIG. 10c, the out-coupling portion 30 may comprise diffractive features, in particular diffractive grooves and/or ridges. The out-coupling elements $F_{30}$ may be zones which comprise diffractive features, in particular diffractive grooves and/or ridges. The out-coupling elements $F_{30}$ may have different diffractive properties in order to tailor the spatial and directional radiance distribution provided by the out-coupling portion 30. The out-coupling elements $F_{30}$ may be arranged on the out-coupling portion 30 to form a substantially continuous diffractive surface.

The out-coupling elements $F_{30}$ may comprise diffractive features such that the diffraction efficiency of said out-coupling portion 30 is lower near the center of said out-coupling portion 30 than near the periphery of said out-coupling portion 30.

The diffraction efficiency of an unit area, in a predetermined diffraction order, means the ratio of out-coupled optical power diffracted in said diffraction order from said unit area to optical power impinging on said unit area.

Each element $F_{30}$ may have its own angular diffraction efficiency. For example, grating period, profile form, profile height, blaze angle, refractive index difference and/or fill factor of a diffractive element $F_{30}$ may be selected to implement a desired angular distribution of radiance at a predetermined location (x,z) on the out-coupling portion 30.

In particular, a greater out-coupling efficiency near the periphery may be implemented e.g. so that out-coupling elements $F_{30}$ may have diffractive ridges, wherein the height of said diffractive ridges is smaller near the center of said out-coupling portion 30 than near the periphery of said out-coupling portion 30.

The radiance of an element $F_{30}$, and consequently also the local out-coupling efficiency may also be adjusted e.g. by choosing the area of an individual element $F_{30}$ with respect to the total area of the out-coupling portion 30. Thus, the out-coupling portion 30 may comprise a plurality of small grating areas having a substantially smooth non-diffracting surface between said grating areas.

A zenith angle θ of a light ray or a light beam is the angle between the direction of said light ray and the direction –SY. The direction –SY is opposite the direction SY. The light ray has a projection on a plane defined by the directions SX and SZ. An azimuth angle ϕ is the angle between said projection PR2 and the direction SX.

FIG. 10d shows zenith $\theta_{LR2}$ and azimuth $\phi_{LR2}$ angles of a light ray LR2. The light ray LR2 may be provided by an out-coupling element $F_{30}$ having coordinates X and Z. The zenith angle $\theta_{LR2}$ is the angle between the direction of the light rays LR2 and the direction –SY. The direction –SY is opposite the direction SY. The light ray LR2 has a projection PR2 on a plane defined by the directions SX and SZ. The azimuth angle $\phi_{LR2}$ is the angle between said projection PR2 and the direction SX.

Figure 11A:
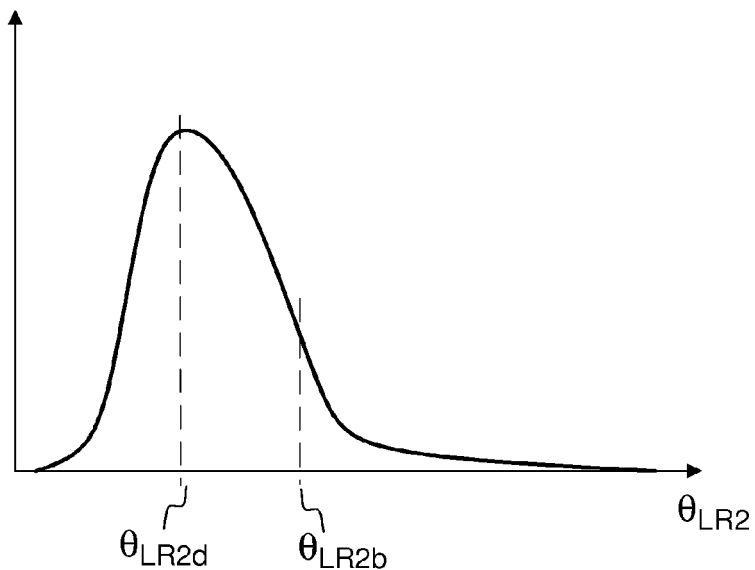
FIG. 11a shows, by way of example, radiance of an out-coupling element as a function of zenith angle of a light ray provided by an out-coupling element.

FIG. 11a shows, by way of example, the radiance L(x2,z2, $\theta_{LR2}, \phi_{LR2}$) of a light-out-coupling element $F_{30}$ in the direction specified by the zenith angle $\theta_{LR2}$ and azimuth angle $\phi_{LR2}$ at the location (x2,z2) of FIGS. 9a and 9b, as a function of the zenith angle $\theta_{LR2}$ of an out-coupled light ray. Radiance L means the power emitted per unit solid angle per unit source area. The unit of radiance L is Watts per steradian per square metre (Wsr$^{-1}$m$^{-2}$).

As was noticed from FIG. 9b, the light of the light ray LR2c will not reach the aperture of the imaging optics 280, and therefore the light ray LR2d should have an increased power to reduce vignetting. The radiance at the angle $\theta_{LR2d}$ may be arranged to be higher than at the angle $\theta_{LR2b}$ in order to reduce vignetting.

Figure 11B:
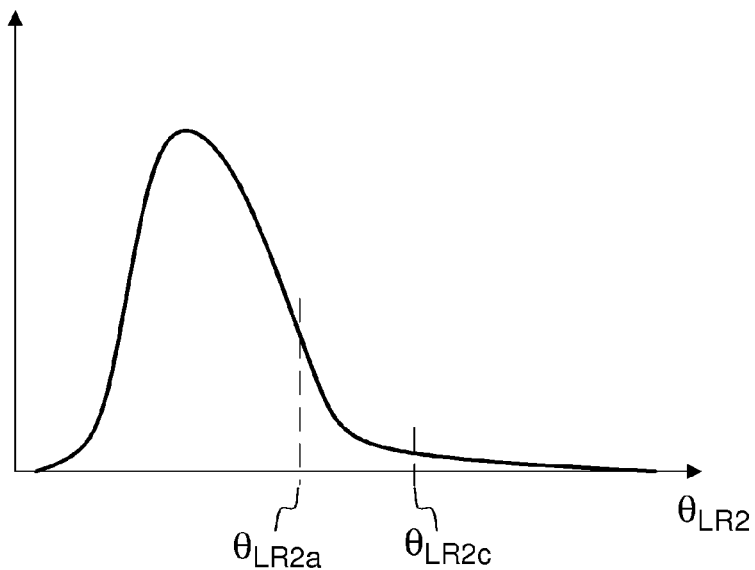
FIG. 11b shows by way of example, radiance of an out-coupling element as a function of zenith angle of a light ray provided by an out-coupling element.

FIG. 11b shows, by way of example, the radiance L(x1,z1, $\theta_{LR2}, \phi_{LR2}$) of a light-out-coupling element $F_{30}$ at the location (x1,z1) of FIGS. 9a and 9b as a function of the zenith angle $\theta_{LR2}$ of an out-coupled light ray. As was noticed from FIG. 9b, light of the light ray LR2c will not reach the aperture of the imaging optics 280, and therefore the radiance L may have a low value in the direction corresponding to said light ray LR2c, i.e. at the zenith angle θLR2c. The radiance at the angle θLR2c may be arranged to be substantially lower than at the angle θLR2a.

In particular, the out-coupling efficiency $E(x,z,\theta_{LR2},\phi_{LR2})$ of coupling light out of the substrate at the location (x,z) in the direction specified by the angles $\theta_{LR2},\phi_{LR2}$ may be selected such that the desired form of the radiance curve may be attained. The efficiency $E(x,z,\theta_{LR2},\phi_{LR2})$ is the ratio of a first optical power to a second optical power, wherein said first optical power is an optical power impinging on a small area dxdz on the substrate side, and said second optical power is the optical power of light coupled out of the substrate from said small area dxdz in the direction having a zenith angle $\theta_{LR2}$, and azimuth angle $\phi_{LR2}$.

The efficiencies $E(x,z,\theta_{LR2},\phi_{LR2})$ of the out-coupling elements $F_{30}$ for coupling light out of the substrate may be selected such that an optical power $P_{TOT}$ illuminating a pixel PX1 near the center of the modulator array 210 is lower than an optical power $P_{TOT}$ illuminating a pixel PX2 near the edge of said modulator array 210.

In particular, the efficiencies $E(x,z,\theta_{LR2},\phi_{LR2})$ of the out-coupling elements $F_{30}$ for coupling light out of the substrate may be selected such that more than 60% of the optical power $P_{TOT}$ illuminating a pixel PX2 at the edge of said modulator array 210 is reflected towards an aperture of the imaging optics 280. Even more than 80% of the light of the peripheral pixel PX2 may be reflected towards the aperture of the imaging optics 280.

Figure 12A:
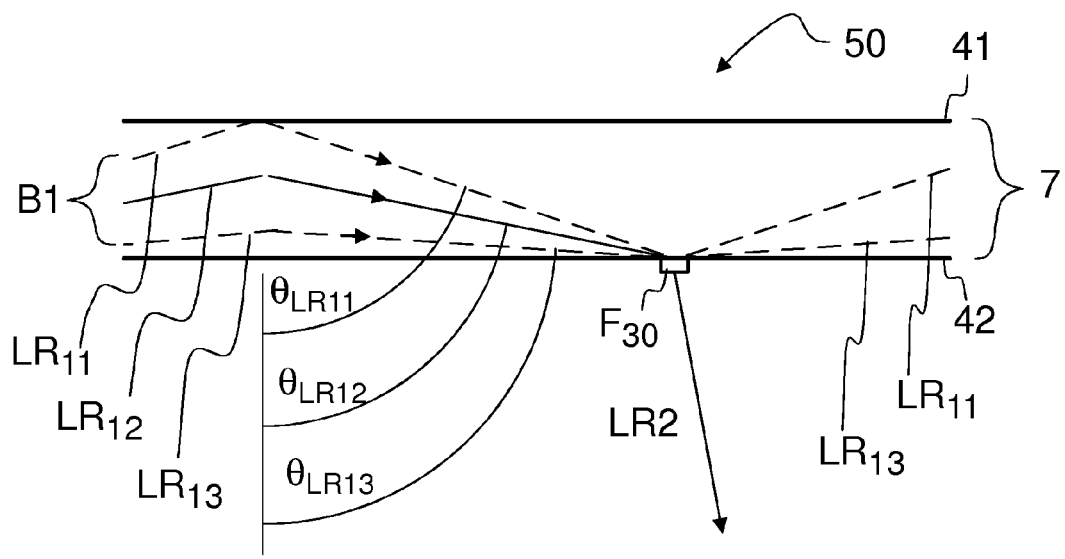
FIG. 12a shows, in a side view, direction-selective coupling of light out of the substrate.

Referring to FIG. 12a, the in-coupled beam B1 may comprise a plurality of light rays $LR_{11}, LR_{12}, LR_{13}$, each having their own zenith angles $\theta_{LR11}, \theta_{LR12}, \theta_{LR13}$. The light rays shown in FIG. 11 impinge on the same out-coupling element $F_{30}$ at a location (x,z). The out-coupling element $F_{30}$ may be arranged to couple only light of the ray LR12 out of the substrate, and reflect the remaining rays LR11 and LR13 back into the substrate 7 substantially without reducing their optical power. In other words, the out-coupling element $F_{30}$ may be arranged to couple light out of the substrate direction-selectively.

The light beam B1 may comprise a nearly infinite number of light rays LR11, LR12, LR13 propagating in different directions.

Figure 12B:
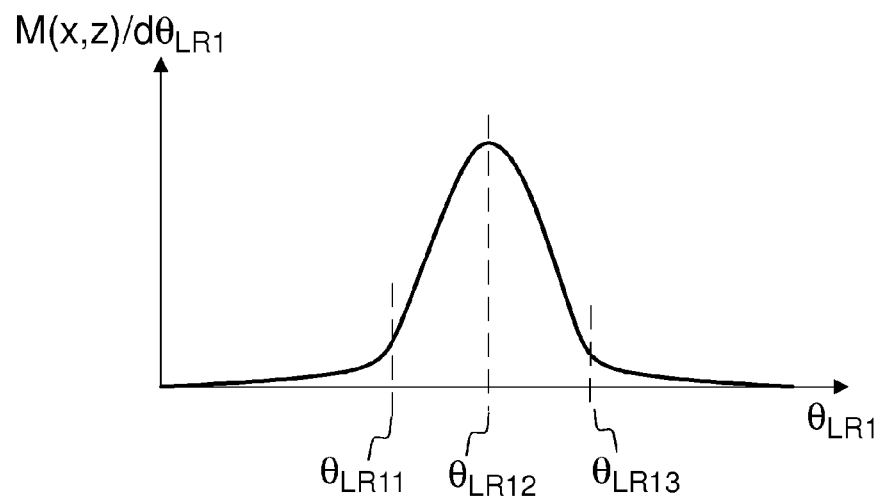
FIG. 12b shows, by way of example, radiant emittance of an out-coupling element as a function of zenith angle of a light ray impinging on said out-coupling element.

FIG. 12b shows, by way of example, the radiant emittance M(x,z) as a function of the zenith angle $\theta_{LR1}$ of a light ray impinging on an out-coupling element $F_{30}$ at a location (x,z). Radiant emittance M means the optical power emitted from a surface. The unit of the emittance M is Watts per square meter (W/m2). It is assumed hypothetically in FIG. 12b that the optical power of the impinging ray is independent of the zenith angle, and that only one ray or a perfectly collimated beam impinges on the out-coupling element $F_{30}$ at a time. The radiant emittance M may have a maximum value for a light ray LR12 having a zenith angle $\theta_{LR12}$, and a lower value for rays having zenith angles $\theta_{LR11}$ and $\theta_{LR12}$.

The out-coupling elements $F_{30}$ may be arranged to direction-selectively couple light of a light ray $LR_{12}$ propagating in a predetermined direction within said substrate 7 out of said substrate, wherein said out-coupling elements $F_{30}$ are arranged to couple light propagating in other directions out of said substrate 7 to a lesser degree.

Figure 13:
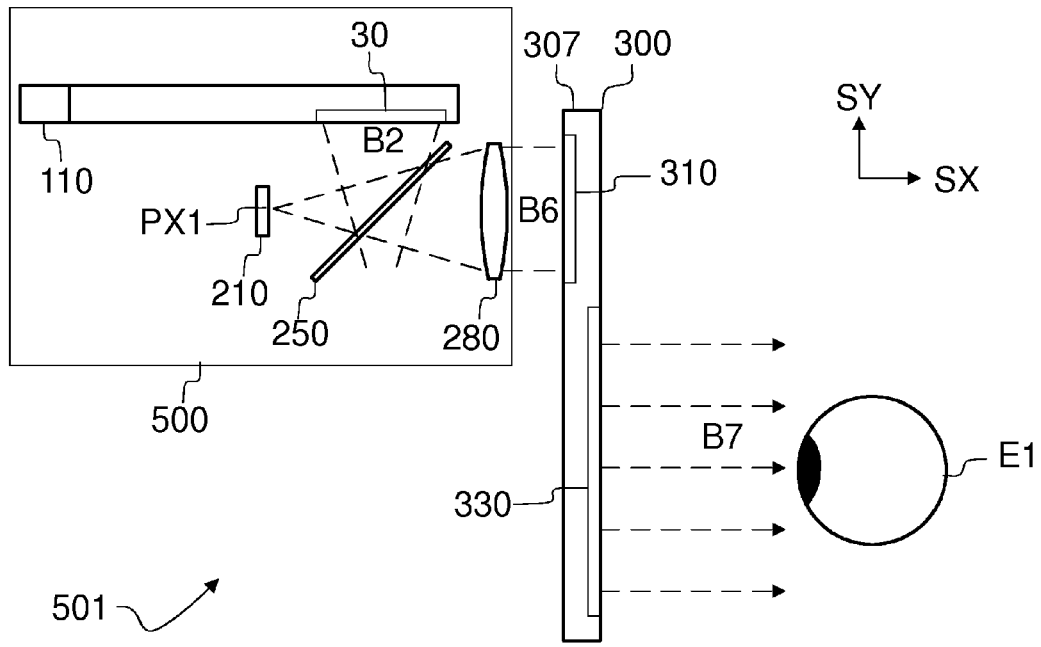
FIG. 13 shows, in a side view, a virtual display device comprising a diffractive beam expander to expand the viewing aperture of said device.

Referring to FIG. 13, the device 500, which comprises at least the illumination unit 100, the modulator array 210, and the imaging optics 280, may also be called as an optical engine. A display device 501 may comprise a diffractive beam expander 300 to expand the exit pupil of the optical engine 500. Consequently, the viewer has a considerable freedom to move the display device 501 with respect to his eye E1 in the directions SX, SY, and SZ, while still being able to see the whole displayed virtual image. The diameter of the aperture of the imaging optics 280 may also be considerably reduced. Consequently, the device 501 may be implemented using smaller, lighter and possibly cheaper lenses.

Light reflected from a predetermined pixel PX1 is collimated by the imaging optics 280 to provide a substantially collimated beam B6 propagating in a predetermined direction. Light of the beam B6 is coupled into the substrate 307 of the beam expander 300 by an in-coupling grating 310. An out-coupling grating 330 provides an output beam B7 by diffracting light of the in-coupled beam out of the substrate 307. The output beam B7 is also substantially collimated and substantially parallel to the beam B6. Consequently, a plurality of enlarged beams B7 corresponding to a plurality of pixels PX1 on the modulator array 210 provide the same virtual image as the beams B6 provided by the imaging optics 280. The gratings 310, 330 of the diffractive beam expander 300 may be arranged, for example, as shown in FIG. 7.

The diffractive beam expander 300 may be e.g. an expander disclosed in the patent application US 2006/0126182.

The diffractive beam expander 300 may be e.g. an expander disclosed in the patent application PCT/FI2007/050322.

The diffractive beam expander 300 may be e.g. an expander disclosed in the patent application PCT/FI2006/050590.

Figure 14:
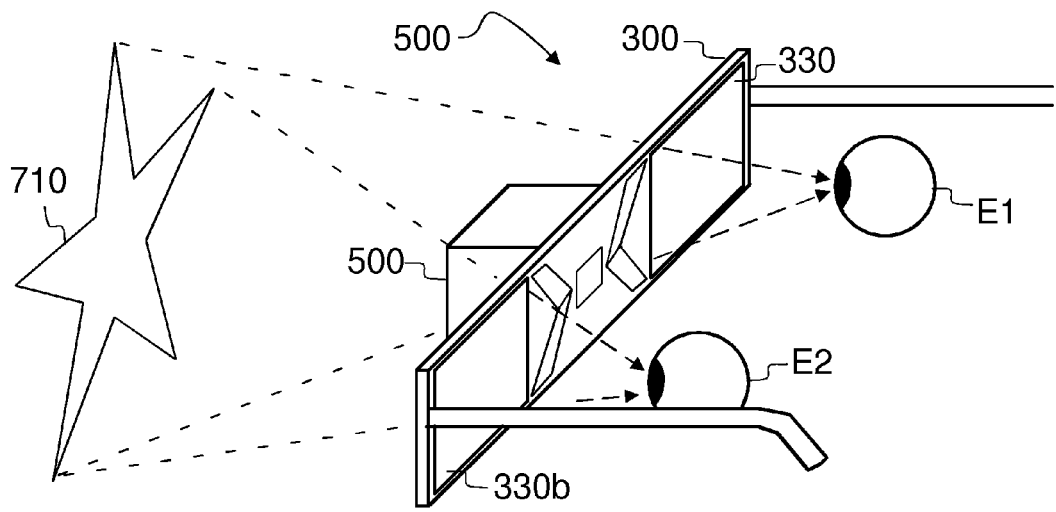
FIG. 14 shows, in a three dimensional view, a bi-ocular virtual display device.

Referring to FIG. 14, a display device 501 may also be bi-ocular in order to display virtual images to both eyes E1, E2 of a viewer. The beams B7 provide for a viewer an impression of a virtual image 710 displayed at an infinite distance from the viewer.

There are several ways to implement a bi-ocular display. The substrate 307 of the diffractive beam expander 300 shown of FIG. 13 may comprise a second out-coupling grating 330b (FIG. 14) to provide enlarged beams B7 also for the left eye E2 of the viewer. The beam B6 shown in FIG. 13 may be distributed to two separate diffractive beam expanders 300, each having its own out-coupling grating 330. Two optical engines 500 may be attached to each other, wherein each optical engine 500 has its own diffractive beam expander 300. Two optical engines 500 may be attached to each other without a diffractive beam expander 300.

The use of two optical engines 500 allows displaying stereo images.

Figure 15:
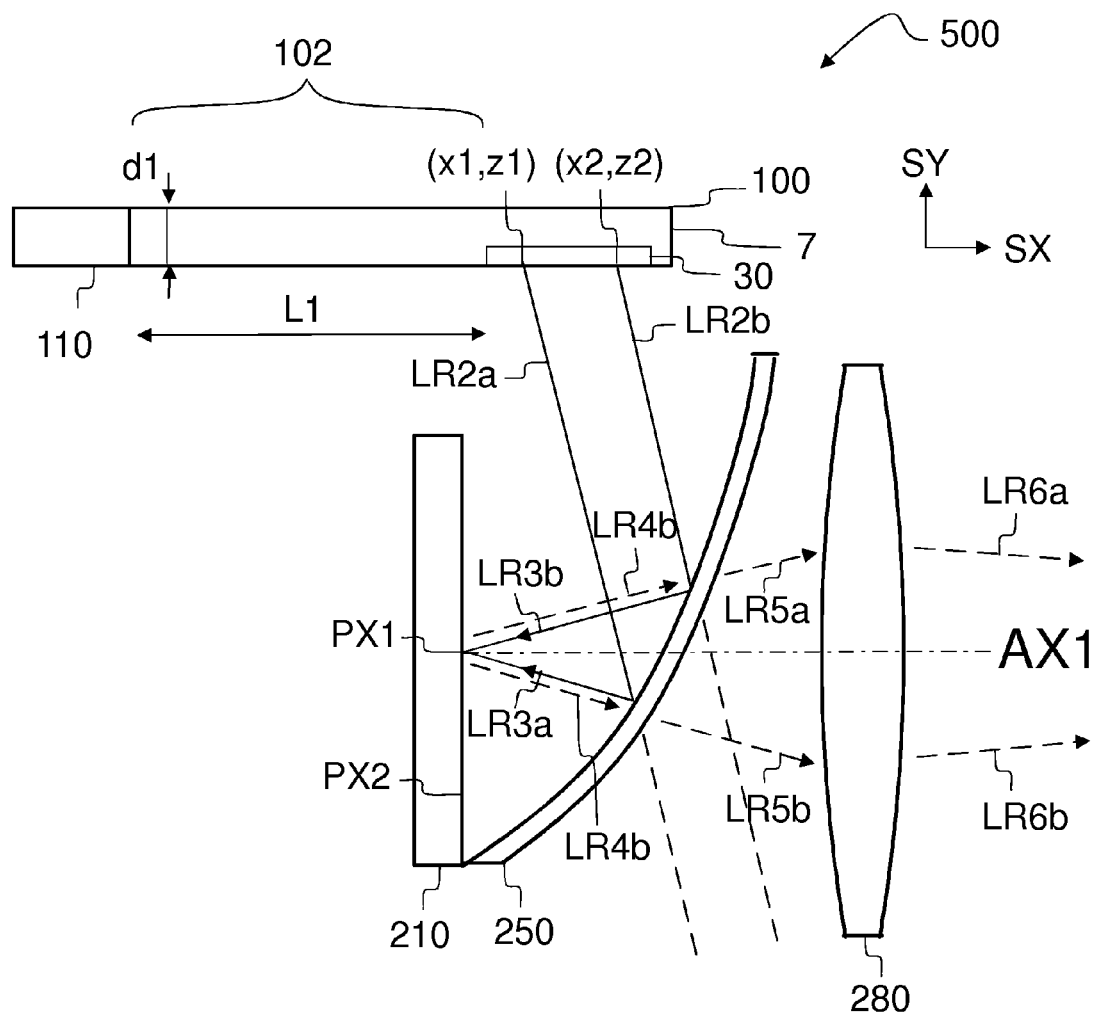
FIG. 15 shows, in a side view, a display device comprising a curved polarizing beam splitter.

Referring to FIG. 15, the display device 500 may comprise a curved polarizing beam splitter 250 in order to reduce the size of the device 500 and/or in order to improve the image quality.

Light rays LR2a, LR2b coupled out of the substrate 7 may impinge on the curved beam splitter 250. A part of the light is transmitted through the splitter and a part of the light is transmitted towards the modulator array 210. Light rays LR3a, LR3b may impinge on a pixel PX1 and may be reflected from said pixel, providing reflected rays LR4a, LR4b. If the pixel PX1 has changed the polarization of reflected light, then a part of the light of the rays LR4a, LR4b may be transmitted through the splitter 250 forming rays LR5a, LR5b. Light of the rays LR5a, LR5b may be focused or collimated by the imaging optics 280 to provide image-forming light rays LR6a, LR6b.

The angular distribution of radiance and/or spatial distribution of radiance over the out-coupling portion 30 may be selected such that optical power $P_{TOT}$ illuminating a pixel PX1 near the center of the modulator array 210 is lower than optical power $P_{TOT}$ illuminating a pixel PX2 near the edge of said modulator array 210, in order to reduce or eliminate vignetting.

The angular distribution of radiance and/or spatial distribution of radiance on the out-coupling portion 30 may be selected such that a greater fraction of optical power reflected from the peripheral pixels PX2 impinges on the effective aperture of the imaging optics 280, when compared with a situation when the spatial intensity distribution on the out-coupling portion 30 is uniform and when each point of the out-coupling portion 30 provides substantially the same angular radiance distribution.

The curved beams splitter 250 may be curved in one dimension, i.e. cylindrically curved. In that case the imaging optics 280 may comprise cylindrical optics in order to form a sharp image.

The curved beams splitter 250 may be curved in two dimensions, i.e. it may be doubly curved. The splitter 250 may form a part of a spherical, ellipsoid or paraboloid surface.

Display devices comprising a curved polarizing beam splitter has been described e.g. in U.S. Pat. No. 6,486,997.

Display devices comprising a curved polarizing beam splitter has been described e.g. in U.S. Pat. No. 7,206,134.

The display device 500 may further comprise e.g. a data processing unit, memory and communications unit to provide access to a mobile telephone network, internet or local area network. The display device 500 may be or may be a part of a device selected from the following list: a display module connectable to a further device, portable device, device with wireless telecommunicating capabilities, imaging device, mobile phone, gaming device, music recording/playing device (based on e.g. MP3-format), remote control transmitter or receiver, navigation instrument, measuring instrument, target finding device, aiming device, navigation device, personal digital assistant (PDA), communicator, portable internet appliance, hand-held computer, accessory to a mobile phone.

The drawings are schematic. For the person skilled in the art, it will be clear that modifications and variations of the devices and methods according to the present invention are perceivable. The particular embodiments described above with reference to the accompanying drawings are illustrative only and not meant to limit the scope of the invention, which is defined by the appended claims.

The invention claimed is:
1. An apparatus comprising:
a light source configured to emit light;
an illuminating unit configured to provide illuminating light by distributing light emitted from said light source;
a reflective light modulator array comprising a plurality of pixels configured to modulate said illuminating light; and
imaging optics configured to focus or collimate light reflected from said pixels,
wherein said illuminating unit comprises a substrate having two surfaces separated by a substantially constant distance, said substrate further comprising:
an in-coupling portion configured to couple light of said light source into said substrate to form a waveguided beam which is confined to said substrate by total internal reflections on said surfaces;
an integrating portion configured to reduce spatial variations in the intensity of said waveguided beam, the ratio of the length of said integrating portion to the thickness of said integrating portion being greater than or equal to 10; and
an out-coupling portion configured to provide said illuminating light by coupling light of said waveguided beam out of said substrate.

2. The apparatus of claim 1 wherein the ratio of the length of said integrating portion to the thickness of said integrating portion is greater than or equal to 50.

3. The apparatus of claim 1 further comprising a polarizing beam splitter configured to reflect illuminating light towards said modulator array and to transmit reflected light from said modulator array to said imaging optics.

4. The apparatus of claim 3 wherein said polarizing beam splitter is curved.

5. The apparatus of claim 1 comprising a first light source configured to emit light of a first color and a second light source configured to emit light of a second color for illuminating said modulator array, said light sources being configured to emit light sequentially during different time periods.

6. The apparatus of claim 1 comprising an in-coupling grating configured to couple light of said light source into said substrate.

7. The apparatus of claim 1 wherein the spatial distribution of out-coupling efficiency of said out-coupling portion is non-uniform.

8. The apparatus of claim 7 wherein said out-coupling portion comprises a plurality of out-coupling prisms, the height of said prisms and/or the fractional area covered by said prisms being lower near the center of said out-coupling portion than near the periphery of said out-coupling portion.

9. The apparatus of claim 7 wherein said out-coupling portion comprises diffractive features, the diffraction efficiency of said out-coupling portion being lower near the center of said out-coupling portion than near the periphery of said out-coupling portion.

10. The apparatus of claim 1 comprising out-coupling elements whose efficiency of coupling light out of said substrate has been selected such that that an optical power illuminating a pixel near the center of the modulator array is lower than an optical power illuminating a pixel near the edge of said modulator array.

11. The apparatus of claim 1 wherein said out-coupling portion comprises a plurality of out-coupling elements whose efficiency of coupling light out of said substrate has been selected such that more than 60% of the optical power reflected from a pixel at the edge of said modulator array is directed towards an aperture of the imaging optics.

12. The apparatus of claim 1 wherein said out-coupling portion comprises a plurality of out-coupling elements configured to direction-selectively couple light propagating in a predetermined direction within said substrate out of said substrate, wherein said out-coupling elements are arranged to couple light propagating in other directions out of said substrate to a lesser degree.

13. The apparatus of claim 1 wherein said illuminating unit comprises a first substrate and a second substrate, an out-coupling portion of said second substrate being arranged to couple light through an out-coupling portion of said first substrate.

14. A method comprising:
coupling light through an in-coupling portion to a substrate of an illuminating unit to form a waveguided beam which is confined to said substrate by total internal reflections on two surfaces of said substrate, said surfaces being separated by a substantially constant thickness;
reducing spatial variations in the intensity of said waveguided beam by transmitting said waveguided beam through an integrating portion of said substrate, the ratio of the length of said integrating portion to the thickness of said integrating portion being greater than or equal to 10;
coupling light of said in-coupled beam out of said substrate by an out-coupling portion of said illuminating unit in order to provide illuminating light;
reflecting and modulating said illuminating light by pixels of a reflective light modulator array; and
focusing or collimating light reflected from said pixels in order to display images.

15. The method of claim 14 wherein the spatial distribution of out-coupling efficiency of said out-coupling portion is non-uniform.

16. The method of claim 15 wherein said out-coupling portion comprises a plurality of out-coupling prisms, the height of said prisms and/or the fractional area covered by said prisms being lower near the center of said out-coupling portion than near the periphery of said out-coupling portion.

17. The method of claim 15 wherein said out-coupling portion comprises diffractive features, the diffraction efficiency of said out-coupling portion being lower near the center of said out-coupling portion than near the periphery of said out-coupling portion.

18. The method of claim 14 wherein an optical power illuminating a pixel near the center of the modulator array is lower than an optical power illuminating a pixel near the edge of said modulator array.

19. The method of claim 14 comprising direction-selectively coupling light propagating in a predetermined direction within said substrate out of said substrate, wherein light propagating in other directions is coupled out of said substrate to a lesser degree.

20. An apparatus for displaying images, said apparatus comprising:
a light emitting means for emitting light;
a light distributing means for providing illuminating light by distributing light emitted from said light emitting means;
a reflective light modulating means comprising a plurality of pixels for modulating said illuminating light; and
imaging means for focusing or collimating light reflected from said pixels,
wherein said light distributing means comprises a substrate having two surfaces separated by a substantially constant distance, said substrate further comprising:
an in-coupling portion to couple light of said light emitting means into said substrate for forming a waveguided beam which is confined to said substrate by total internal reflections on said surfaces;
an integrating portion for reducing spatial variations in the intensity of said waveguided beam, the ratio of the length of said integrating portion to the thickness of said integrating portion being greater than or equal to 10; and
an out-coupling portion for providing said illuminating light by coupling light of said waveguided beam out of said substrate.

\* \* \* \* \*